United States Patent [19]

Huang et al.

[11] 4,039,997
[45] Aug. 2, 1977

[54] RESISTANCE MATERIAL AND RESISTOR MADE THEREFROM

[75] Inventors: Cornelius Y. D. Huang, Bala Cynwyd; Kenneth M. Merz, Gladwyne, both of Pa.

[73] Assignee: TRW Inc., Cleveland, Ohio

[21] Appl. No.: 673,303

[22] Filed: Apr. 2, 1976

Related U.S. Application Data

[63] Continuation-in-part of Ser. No. 409,712, Oct. 25, 1973, abandoned.

[51] Int. Cl.² .................... H01C 8/00; B32B 17/06; H01B 1/04
[52] U.S. Cl. ................................. 338/308; 252/518; 252/520; 427/101; 427/103; 427/126; 428/426; 428/432; 428/446; 428/539
[58] Field of Search ............ 428/426, 538, 539, 446, 428/432; 338/309, 308; 252/518, 520, 518.1; 106/55, 73.5; 427/101, 103, 126

[56] References Cited

U.S. PATENT DOCUMENTS

| | | | |
|---|---|---|---|
| 2,848,586 | 8/1958 | Wainer | 252/520 |
| 2,891,914 | 6/1959 | Fenity | 252/518 C |
| 3,027,330 | 3/1962 | Schrewelius | 252/520 |
| 3,027,332 | 3/1962 | Medin | 252/520 |
| 3,304,199 | 2/1967 | Faber | 252/518 |
| 3,394,087 | 7/1968 | Huang | 252/518 C |
| 3,441,516 | 4/1969 | Mulligan | 252/518 |
| 3,442,822 | 5/1969 | Kim | 252/518 |
| 3,503,801 | 3/1970 | Huang | 428/427 |

Primary Examiner—Ellis Robinson
Attorney, Agent, or Firm—Jacob Trachtman

[57] ABSTRACT

A vitreous enamel resistance material comprising a mixture of a vitreous glass frit and fine particles of a metal silicide of the transition elements of Groups IV, V and VI of the periodic chart. The metal silicide may be of molybdenum disilicide ($MoSi_2$), tungsten disilicide ($WSi_2$), vanadium disilicide ($VSi_2$), titanium disilicide ($TiSi_2$), zirconium disilicide ($ZrSi_2$), chromium disilicide ($CrSi_2$) or tantalum disilicide ($TaSi_2$). The ingredients of the vitreous enamel resistance material are present in the proportion of, by weight, 25 to 90% glass frit and 75 to 10% metal silicide. An electrical resistor is made with the vitreous enamel resistor material of the present invention by coating a ceramic substrate with the vitreous enamel resistance material and firing the coated substrate at a temperature sufficient to melt the glass frit of the vitreous enamel resistance material. Upon cooling, the glass hardens so that the resultant resistor comprises the substrate having on the surface thereof a film of glass with the metal silicide particles embedded in and dispersed throughout the glass film.

4 Claims, 1 Drawing Figure

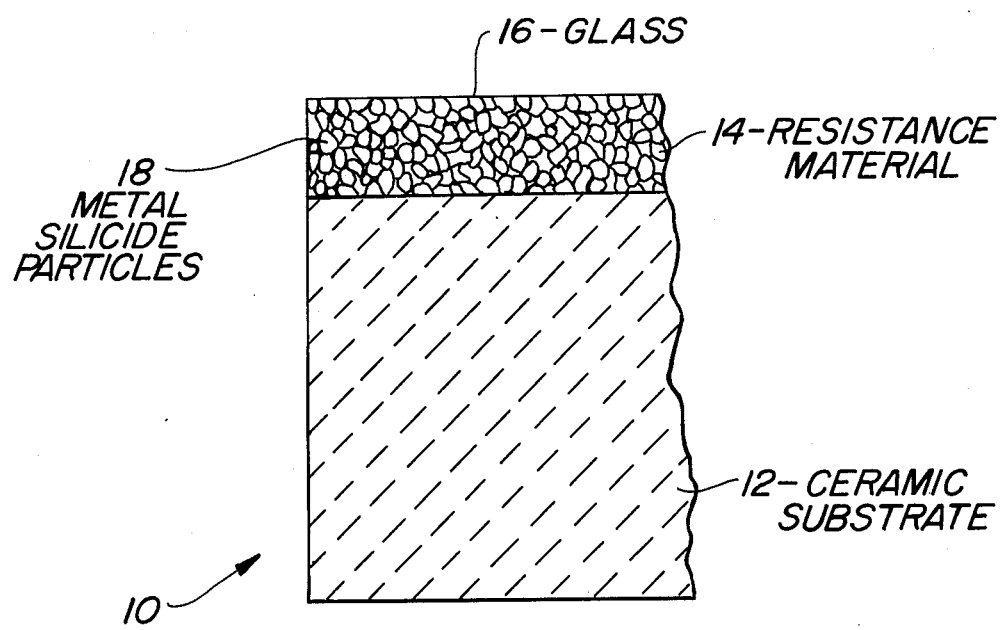

RESISTANCE MATERIAL AND RESISTOR MADE THEREFROM

This is a continuation-in-part of our copending application Ser. No. 409,712 filed Oct. 25, 1973 entitled Resistance Material and Resistor Made Therefrom now abandoned.

The invention relates to vitreous enamel resistance materials, resistors made therefrom and the method of making the same.

BACKGROUND

A type of electrical resistance material which has recently come into commercial use is a vitreous enamel resistance material which comprises a mixture of a glass frit and finely divided particles of an electrical conductive material. The vitreous enamel resistance material is coated on the surface of a substrate of an electrical insulating material, usually a ceramic, and fired to melt the glass frit. When cooled, there is provided a film of glass having the conductive particles dispersed therein. Terminations are connected to the film to permit the resultant resistor to be connected in the desired circuit.

The materials which have been generally used for the conductive particles are the noble metals. Although the noble metals provide vitreous enamel resistance materials which have satisfactory electrical characteristics, they have the disadvantage that they are expensive. Thus, the resistors made from the vitreous enamel resistance materials containing the noble metals are expensive to manufacture. Therefore, it would be desirable to have a vitreous enamel electrical resistance material which utilizes a relatively inexpensive conductive material so as to provide an electrical resistor which is relatively inexpensive to manufacture. In addition, the conductive material used must be capable of providing a resistance material having a wide range of resistance values and which is relatively stable over the entire range of the resistance values. By being stable it is meant that the resistance value of the resistance material does not change or changes only a small amount under operating conditions, particularly when subjected to changes in temperature. The change in resistance value of an electrical resistor per degree change in temperature is referred to as the "temperature coefficient of resistance" of the resistor. The closer the temperature coefficient of resistance is to zero, the more stable is the resistor with respect to changes in temperature.

SUMMARY

It is an object of the present invention to provide a novel vitreous enamel resistance material utilizing a relatively inexpensive conductive material.

It is another object of the present invention to provided an electrical resistor utilizing a novel vitreous enamel resistance material.

It is a further object of the present invention to provide a vitreous enamel resistor having a relatively wide range of resistance values, which is relatively stable over the entire range of resistance values and which is relatively inexpensive to manufacture.

It is a still further object of the present invention to provide a vitreous enamel resistance material comprising a mixture of a glass frit and finely divided particles of a metal silicide selected from the group consisting of molybdenum disilicide, tungsten disilicide, vanadium disilicide, titanium disilicide, zirconium disilicide, chromium disilicide and tantalum disilicide.

Other objects will appear hereinafter.

The invention accordingly comprises a composition of matter and product formed therewith possessing the characteristics, properties and relation of constituents which will be exemplified in the composition hereinafter described, and the scope of the invention will be indicated in the claims.

BRIEF DESCRIPTION OF DRAWING

The FIGURE is a cross-sectional view, on a highly exaggerated scale, of a resistor produced in accordance with the present invention.

DESCRIPTION OF INVENTION

In general, the vitreous enamel resistance material of the present invention comprises a mixture of a vitreous glass frit and fine particles of a metal silicide of the transition elements of Groups IV, V and VI of the periodic chart. The metal silicide can be molybdenum disilicide ($MoSi_2$), tungsten disilicide ($WSi_2$), vanadium disilicide ($VSi_2$), titanium disilicide ($TiSi_2$), zirconium disilicide ($ZrSi_2$), chromium disilicide ($CrSi_2$) or tantalum disilicide ($TaSi_2$). More particularly, the vitreous enamel resistance material of the present invention comprises a mixture of a vitreous glass frit and a metal silicide of the above-stated group in the proportion of, by weight, 25 to 90% glass frit and 75 to 10% metal silicide.

The glass frit used in the resistance material of the present invention may be of any well-known composition which has a melting temperature below that of the refractory metal silicide. The glass frits most preferably used are the borosilicate frits, such as lead borosilicate frit, bismith, cadmium, barium, calcium or other alkaline earth borosilicate frits. The preparation of such glass frits is well known and consists, for example, in melting together the constituents of the glass in the form of the oxides of the constituents, and pouring such molten composition into water to form the frit. The batch ingredients may, of course, be any compound that will yield the desired oxides under the usual conditions of frit production. For example, boric oxide will be obtained from boric acid, silicon dioxide will be produced from flint, barlum oxide will be produced from barium carbonate, etc. The coarse frit is preferably milled in a ball-mill with water to reduce the particle size of the frit and to obtain a frit of substantially uniform size.

To make the resistance material of the present invention, the glass frit and refractory metal silicide are broken down, such as by ball-milling, to a substantially uniform particle size. An average particle size of between 1 to 2 microns has been found to be preferable. The glass frit and refractory metal silicide powder are thoroughly mixed together, such as by ball-milling in water or an organic medium, such as butyl carbitol acetate or a mixture of butyl carbitol acetate and toluol. The mixture is then adjusted to the proper viscosity for the desired manner of applying the resistance material to a substrate by either adding or removing the liquid medium of the material.

To make a resistor with the resistance material of the present invention, the resistance material is applied to a uniform thickness on the surface of a substrate. The substrate may be a body of any material which can withstand the firing temperature of the resistance material composition. The substrate is generally a body of a ceramic, such as glass, porcelain, refractory, barium titinate, or the like. The resistance material may be applied on the substrate by brushing, dipping, spraying, or screen stencil application. The substrate with the resistance material coating is then fired in a conventional furnace at a temperature at which the glass frit becomes molten. For resistance materials of the present invention containing any of the above-stated metal silicides except molybdenum disilicide, it has been found preferable to fire the coated substrate in an inert atmosphere, such as argon, helium, nitrogen or a mixture of nitrogen and hydrogen, to achieve a resistor of better stability. However, for a resistance material of the present invention in which the metal silicide is molybdenum disilicide, it has been found that firing the resistor in air provides a more stable resistor. When the coated substrate is cooled, the vitreous enamel hardens to bond the resistance material to the substrate.

As shown in the drawing, the resultant resistor of the present invention is generally designated as 10. Resistor 10 comprises the ceramic substrate 12 having a layer 14 of the resistance material of the present invention coated and fixed thereon. The resistance material layer 14 comprises the glass 16 and the finely divided particles 18 of the metal silicide embedded within and dispersed throughout the glass 16.

EXAMPLE I

A plurality of resistance materials of the present invention were made in which the conductive material was molybdenum disilicide in the various amounts shown in Table I and the glass frit was a barium, titanium, aluminum borosilicate glass. Each of the resistance materials was made by mixing together the glass frit and molybdenum disilicide particles in a ball-mill in butyl carbitol acetate. Resistors were made with each of the resistance materials by coating cylindrical ceramic bodies with the resistance material and firing the coated ceramic bodies in a conveyor furnace for approximately a thirty minute cycle, at a temperature and in an atmosphere as indicated in Table I. A number of resistors of each of the compositions were made, and the average resistance values and temperature coefficients of resistance of the resulting resistors of each group are shown in Table I.

TABLE I

| Molybdenum Disilicide (% by wt.) | Temperature and Firing Atmosphere | Resistance (ohms/□) | Temperature Coef. of Resistance (% per ° C) | |
|---|---|---|---|---|
| | | | +25° C to 150° C | +25° C to −55° C |
| 15 | 1020° C-Air | 1,900 | +.0080 | +.0053 |
| 20 | 1020° C-Air | 490 | ±.0109 | +.0094 |
| 25 | 1020° C-Air | 70 | +.0217 | +.0222 |
| 50 | 970° C-Air | 6 | +.1420 | +.1465 |
| 60 | 970° C-Air | 25 | +.1038 | +.1038 |
| 10 | 1050° C-N$_2$ | 8,900 | −.0214 | −.0346 |
| 15 | 1100° C-N$_2$* | 1,300 | ±.0066 | −.0119 |
| 25 | 1020° C-N$_2$ | 500 | +.0120 | +.0066 |
| 50 | 970° C-N$_2$ | 5 | +.1117 | +.1166 |
| 60 | 970° C-N$_2$ | 4.3 | +.1196 | +.1222 |

*Fired on a 20 minute cycle.

EXAMPLE II

A plurality of resistance materials of the present invention were made in which the conductive material was tungsten disilicide in the various amounts shown in Table II, and the glass frit was a barium, titanium, aluminum borosilicate glass. Each of the resistance materials was made in the same manner as the resistance materials of Example I, and resistors were made with each of the resistance materials in the same manner as described in Example I. The resistors were fired at 1050° C in the type of atmosphere indicated in Table II and the average resistance values and temperature coefficients of resistance for each group of the resultant resistors are indicated in Table II.

TABLE II

| Tungsten Disilicide (% by wt.) | Firing Atmosphere | Resistance (ohms/□) | Temperature Coef. of Resistance (% per ° C) | |
|---|---|---|---|---|
| | | | +25° C to 150° C | +25° C to −55° C |
| 11 | Air | 5,000 | +.1346 | +.0984 |
| 15 | Air | 2,300 | +.0547 | +.0810 |
| 20 | Air | 600 | +.0670 | +.0957 |
| 25 | Air | 219 | +.1073 | +.1074 |
| 30 | Air | 75 | +.1307 | +.1286 |
| 11 | N$_2$ | 875,000 | −.1010 | −.1458 |
| 15 | N$_2$ | 2,500 | −.0063 | −.0077 |
| 20 | N$_2$ | 5,000 | −.0025 | −.0069 |
| 25 | N$_2$ | 2,000 | ±.0055 | −.0039 |
| 30 | N$_2$ | 1,500 | +.0162 | +.0123 |
| 50 | N$_2$ | 36 | +.0638 | +.0670 |
| 60 | N$_2$ | 21 | +.0685 | +.0688 |

EXAMPLE III

A plurality of resistance materials of the present invention were made in which the conductive material was zirconium disilicide in the various amounts shown in Table III and the glass frit was a barium, titanium, aluminum borosilicate glass. Each of the resistance materials was made in the same manner as the resistance materials of Example I, and resistors were made with each of the resistance materials in the same manner as described in Example I. The resistors were fired at 970° C in the type of atmosphere indicated in Table III, and the average resistance values and temperature coefficients of resistance for each group of the resultant resistors are indicated in Table III.

TABLE III

| Zirconium Disilicide (% by wt.) | Firing Atmosphere | Resistance (ohms/□) | Temperature Coef. of Resistance (% per ° C) | |
|---|---|---|---|---|
| | | | +25° C to 150° C | +25° C to −55° C |
| 15 | N$_2$ | 6,300 | ±.0021 | ±.0035 |
| 20 | N$_2$ | 475 | +.0225 | +.0232 |
| 25 | N$_2$ | 104 | +.0262 | +.0278 |
| 30 | N$_2$ | 44 | +.0265 | +.0277 |
| 15 | Air | 3,000 | +.0130 | +.0127 |
| 20 | Air | 610 | +.0184 | +.0178 |
| 25 | Air | 238 | +.0285 | +.0257 |
| 30 | Air | 112 | +.0334 | +.0344 |

EXAMPLE IV

Table IV shows the resistance values and temperature coefficients of resistance of a number of resistors of the present invention using resistance materials made from the various metal silicides indicated in Table IV in the indicated amounts with a barium, titanium borosilicate glass frit. The resistance materials were made in the same manner as the resistance materials of Example I and resistors were made with the resistance material in the same manner as described in Example I. The resistors were fired at approximately 1000° in a Nitrogen atmosphere.

TABLE IV

| Conducting | % by Weight | Resistance (ohms/□) | Temperature Coef. of Resistance (% per ° C) | |
|---|---|---|---|---|
| Material | | | +25° C to 150° C | +25° C to −55° C |
| $TiSi_2$ | 15 | 124 | +.0163 | +.0161 |
| $TiSi_2$ | 25 | 63 | +.0166 | +.0181 |
| $TiSi_2$ | 30 | 41 | +.0143 | +.0154 |
| $VSi_2$ | 20 | 1,300 | +.0222 | ±.0108 |
| $VSi_2$ | 25 | 275 | +.0298 | ±.0355 |
| $VSi_2$ | 30 | 42 | ±.0411 | ±.0495 |
| $CrSI_2$ | 20 | 275 | +.0184 | +.0235 |
| $CrSi$ | 30 | 99 | +.0568 | +.0780 |
| $TaSi_2$ | 50 | 81 | +.0319 | +.0303 |

EXAMPLE V

A plurality of resistance materials of the present invention were made in which the conductive material was a metal silicide shown in Table V, and the glass frit was a barium, titanium borosilicate glass. Each of the resistance materials was made in the same manner as the resistance material of Example I, and the resistors were made with each of the resistance materials in the same manner as described in Example I. The resistors were fired in a nitrogen atmosphere on a 30 minute cycle at a temperature as indicated in Table V and the average resistance values and temperature coefficients of resistance for the resultant resistors are shown in Table V.

TABLE V

| Conducting Material (% by vol.) | Firing Temperature | Resistance (ohms/□) | Temperature Coef. of Resistance (% per ° C) | |
|---|---|---|---|---|
| | | | +25° C to 150° C | +25° C to −55° C |
| $WSi_2$ 5% | 1150° C | 9K | −.0148 | −.0220 |
| $MoSi_2$ 6% | 1100° C | 925 | +.0257 | +.0215 |
| $MoSi_2$ 8% | 1100° C | 560 | +.0327 | +.0304 |
| $MoSi_2$ 10% | 1100° C | 413 | +.0372 | +.0360 |
| $WSi_2$ 12% | 1100° C | 269 | +.0268 | +.0297 |
| $WSi_2$ 15% | 1100° C | 179 | +.0294 | +.0294 |

EXAMPLE VI

A plurality of resistance materials of the present invention were made in which 30% by weight of a silicide shown in Table VI, and 70% by weight of a barium, titanium, aluminum borosilicate frit were used. Each of the resistance materials was made in the same manner as the resistance materials of Example I, and resistors were made with each of the resistance materials in the same manner as described in Example I. The resistors were fired in a nitrogen atmosphere on a 30 minute cycle at a temperature indicated in Table VI. The average resistance values, temperature coefficients of resistance of the resistors, and the reaction products for the resultant resistor glazes are shown in Table VI. The reaction products for the resistor glazes were determined by analysis of detected X-ray diffraction patterns. The detected products are given in the order of decreasing strength of their diffraction pattern lines.

TABLE VI

| Metal Silicide | Firing Temperature | Resistance (ohms/□) | Temperature Coef. of Resistance (% per ° C) | | Reaction Products |
|---|---|---|---|---|---|
| | | | +25° C to 150° C | +25° C to −55° C | |
| $WSi_2$ | 1100° C | 1K | +.0206 | +.0209 | $\delta WB$, $WSi_2$ |
| $MoSi_2$ | 1100° C | 13 | +.1092 | +.1010 | $MoSi_2$, $Mo_2B_5$ |
| $VSi_2$ | 1100° C | 33 | +.0931 | +.1042 | $VSi_2$, $BaSi_2O_5$ |
| $CrSi_2$ | 1100° C | 21 | +.0960 | +.1266 | $CrSi_2$, $CrB_2$, $BaSi_2O_5$ |
| $TaSi_2$ | 1100° C | Non-Cond. | — | — | $TaSi_2$, $TaB_2$, $\gamma TaB$ |
| $TaSi_2$ | 1150° C* | 80 | +.0340 | +.0187 | $TaSi_2$, $TaB_2$, $\gamma TaB$ |
| $TiSi_2$ | 1100° C | 9 | +.0464 | ±.0303 | $TiSi_2$, $TiB_2$, $BaSi_2O_3$, $TiO_2$ |
| $ZnSi_2$ | 1100° C | 9 | +.0526 | +.0485 | $ZrSi_2$, $ZrB_2$ |

*50% by weight of $TaSi_2$ fired in nitrogen on a 20 minute cycle.

Analysis of the diffraction pattern data of the resistor glazes in Table VI, indicates that during the firing of the resistance material, the silicon of the metal silicide has a strong tendency to react with the glass. The remaining metal of the silicide then combines with boron from the glass to form a boride or with barium to form a mixed oxide. The conductors which are formed by firing the resistance materials, thus, include both the metal silicides and their borides.

It should be understood that the examples of the resistors and resistance materials of the present invention shown in Tables I through VI are given merely to illustrate certain details of the invention and are not to be taken as in any way limiting the invention thereto. The present invention may be embodied in other specific forms without departing from the spirit or essential attributes thereof and, accordingly, reference should be made to the appending claims, rather than to the foregoing specification as indicating the scope of the invention.

What is claimed is:

1. An electrical resistor comprising a ceramic body containing on the surface thereof a coating of vitreous enamel resistor composition consisting essentially, of a borosilicate glass and, about 75% to 10% by weight of finely divided particles of a metal silicide selected from the group consisting of tungsten disilicide, molybdenum disilicide, vanadium disilicide, titanium disilicide, zirconium disilicide, chromium disilicide and tantalum disilicide, mixed with its fired reaction products with said borosilicate glass, said composition beting heated at a temperature sufficient to provide said reaction products.

2. An electrical resistor of the vitreous enamel type produced by preparing a vitreous enamel composition consisting essentially of a borosilicate glass frit and about 75 to 10% by weight of finely divided conductive particles of a metal silicide selected from the group consisting of tungsten disilicide, molybdenum disilicide, vanadium disilicide, titanium disilicide, zirconium disilicide, chromium disilicide and tantalum disilicide; applying a uniform thickness of the composition to an insulating refractory substrate; firing the coated substrate at a temperature of about 970° C to 1150° C at which the glass frit becomes molten and below the melting temperature of the conductive particles in a non-oxidizing atmosphere; cooling the resistor to form a glass matrix having the conductive particles dispersed therein; and connecting terminations to the vitreous enamel resistor composition.

3. The method of making an electrical resistor of the type wherein a vitreous enamel resistor composition is applied to a substrate comprising:

preparing a vitreous enamel resistor composition consisting essentially of a borosilicate glass frit and about 75 to 10% by weight of finely divided conductive particles of a metal silicide selected from the group consisting of tungsten disilicide, molybdenum disilicide, vanadium disilicide, titanium disilicide, zirconium disilicide, chronium disilicide and tantalum disilicide;

applying a uniform thickness of the composition to an insulating refractory substrate;

firing the coated substrate at a temperature of about 970° to 1150° C at which the glass frit becomes molten and below the melting temperature of the conductive particles in a non-oxidizing atmosphere;

cooling the resistor to form a glass matrix having the conductive particles dispersed therein; and connecting terminations to the vitreous enamel resistor composition.

4. The method of claim 3 in which the coated substrate is fired in a nitrogen atmosphere.

* * * * *